US011995214B2

(12) United States Patent
Mosconi et al.

(10) Patent No.: US 11,995,214 B2
(45) Date of Patent: May 28, 2024

(54) SYSTEM AND METHOD FOR MANAGEMENT OF POLICIES AND USER DATA DURING APPLICATION ACCESS SESSIONS

(71) Applicant: Accenture Global Solutions Limited, Dublin (IE)

(72) Inventors: Laura Mosconi, Rome (IT); Fabio Mungo, Rome (IT); Davide Di Perna, Rome (IT)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 352 days.

(21) Appl. No.: 16/746,379

(22) Filed: Jan. 17, 2020

(65) Prior Publication Data

US 2021/0141913 A1 May 13, 2021

(30) Foreign Application Priority Data

Nov. 12, 2019 (EP) .................................... 19208478

(51) Int. Cl.
*G06F 21/62* (2013.01)
*G06F 9/54* (2006.01)

(52) U.S. Cl.
CPC .............. *G06F 21/629* (2013.01); *G06F 9/54* (2013.01)

(58) Field of Classification Search
CPC .................................. G06F 21/629; G06F 9/54
(Continued)

(56) References Cited

U.S. PATENT DOCUMENTS 9,251,193 B2 * 2/2016 Ariel ....................... G06F 16/23
9,286,482 B1 * 3/2016 Dumont ................. G06F 21/32
(Continued)

FOREIGN PATENT DOCUMENTS

CA      3066238 A1 * 12/2018 ............ G06F 11/368
CN      1249590 A  *  4/2000 ............. G06Q 20/20
(Continued)

OTHER PUBLICATIONS

Maler, "Extending the Power of Consent with User-Managed Access: a Standard Architecture for Asynchronous, Centralizable, Internet-Scalable Consent", IEEE, doi: 10.1109/SPW.2015.34, 2015, pp. 175-179. (Year: 2015).*
(Continued)

*Primary Examiner* — Peter C Shaw
(74) *Attorney, Agent, or Firm* — Plumsea Law Group, LLC

(57) ABSTRACT

A system and method for managing access by end-users to features of an application through a policy management service is disclosed. Specifically, the method and system enable an application provider to utilize tools made available by the policy management service for creation of policies, such as terms and conditions and/or consent to data usage. In addition, the policy management service can provide an interface from which application administrators can link subset(s) of an API to specific policies, as well as the manage the presentation of these policies to end-users of the API that offer options to review and accept or reject the policies. The service further allows users to revoke an acceptance to a policy and to review their privacy settings. In addition, the policy management service can regulate the access of user data by external entities based on the policy limits.

20 Claims, 11 Drawing Sheets

(58) Field of Classification Search
USPC .......................................................... 726/1
See application file for complete search history.

(56) References Cited

U.S. PATENT DOCUMENTS

| | | | | |
|---|---|---|---|---|
| 10,331,895 | B1* | 6/2019 | Roth | G06F 21/6209 |
| 2002/0129006 | A1* | 9/2002 | Emmett | G06F 16/986 |
| | | | | 707/E17.118 |
| 2004/0243692 | A1* | 12/2004 | Arnold | G06F 9/5016 |
| | | | | 711/170 |
| 2008/0141339 | A1* | 6/2008 | Gomez | H04L 63/20 |
| | | | | 726/1 |
| 2008/0184330 | A1* | 7/2008 | Lal | G06F 21/31 |
| | | | | 726/1 |
| 2009/0070627 | A1* | 3/2009 | Lohn | G06F 11/0793 |
| | | | | 714/15 |
| 2009/0271847 | A1* | 10/2009 | Karjala | H04L 63/0807 |
| | | | | 726/6 |
| 2009/0327296 | A1* | 12/2009 | Francis | G06F 16/00 |
| | | | | 707/999.009 |
| 2012/0151557 | A1* | 6/2012 | Ahmed | G06F 21/6218 |
| | | | | 715/764 |
| 2012/0259970 | A1* | 10/2012 | Hu | H04W 4/20 |
| | | | | 709/224 |
| 2012/0324539 | A1* | 12/2012 | Rangachari | G06F 21/629 |
| | | | | 726/4 |
| 2013/0067598 | A1* | 3/2013 | Da Palma | G06F 21/57 |
| | | | | 726/29 |
| 2013/0211987 | A1* | 8/2013 | Louie | G06Q 40/00 |
| | | | | 705/35 |
| 2014/0289333 | A1* | 9/2014 | Chan | H04L 63/08 |
| | | | | 709/204 |
| 2015/0067124 | A1* | 3/2015 | Hui | H04W 4/50 |
| | | | | 709/223 |
| 2015/0150119 | A1* | 5/2015 | Holland | G06F 21/604 |
| | | | | 726/17 |
| 2015/0242621 | A1* | 8/2015 | Jackson | G06F 21/6281 |
| | | | | 726/17 |
| 2015/0242840 | A1* | 8/2015 | Kursun | G06F 21/552 |
| | | | | 705/44 |
| 2016/0381076 | A1* | 12/2016 | Kamble | H04L 63/0209 |
| | | | | 726/1 |
| 2017/0270438 | A1* | 9/2017 | Gurevich | G06Q 10/0633 |
| 2018/0131681 | A1* | 5/2018 | Husser | H04L 63/102 |
| 2018/0203984 | A1* | 7/2018 | Grigera | G06F 21/30 |
| 2019/0036966 | A1* | 1/2019 | Lin | H04L 63/20 |
| 2020/0117824 | A1* | 4/2020 | Upadhyay | G06F 21/6245 |
| 2020/0396058 | A1* | 12/2020 | Yang | G06F 16/2379 |
| 2022/0215106 | A1* | 7/2022 | Brooks | G06F 21/51 |

FOREIGN PATENT DOCUMENTS

| | | | | |
|---|---|---|---|---|
| CN | 108537027 | A | * | 9/2018 |
| CN | 111966977 | A | * | 11/2020 |
| JP | 2018156312 | A | * | 10/2018 |
| KR | 20090025372 | A | * | 3/2009 ............ G06F 21/22 |
| WO | WO-9825373 | A2 | * | 6/1998 ............ G06F 21/10 |
| WO | WO-2005086681 | A2 | * | 9/2005 ............ G07F 17/32 |
| WO | 2015/109110 | A1 | | 7/2015 |

OTHER PUBLICATIONS

Neisse et al., "An agent-based framework for Informed Consent in the internet of things", IEEE, doi: 10.1109/WF-IoT.2015.7389154, 2015, pp. 789-794. (Year: 2015).*

Robol et al., "Consent Verification Under Evolving Privacy Policies," 2019 IEEE 27th International Requirements Engineering Conference (RE), 2019, pp. 422-427, doi: 10.1109/RE.2019.00056. (Year: 2019).*

Morel et al., "A Generic Information and Consent Framework for the IoT," 2019 18th IEEE International Conference on Trust, Security and Privacy in Computing and Communications, 2019, pp. 366-373, doi: 10.1109/T (Year: 2019).*

Jones et al., "AI and the Ethics of Automating Consent," in IEEE Security & Privacy, vol. 16, No. 3, pp. 64-72, May/Jun. 2018, doi: 10.1109/MSP.2018.2701155. (Year: 2018).*

Tuunanen et al., "ASLA: reverse engineering approach for software license information retrieval," Conference on Software Maintenance and Reengineering (CSMR'06), Bari, 2006, pp. 4 pp.-294, doi: 10.1109/CSMR.2006.10. (Year: 2006).*

Liu et al., "Predicting Licenses for Changed Source Code," 2019 34th IEEE/ACM International Conference on Automated Software Engineering (ASE), San Diego, CA, USA, 2019, pp. 686-697, doi: 10.1109/ASE.2019.00070. (Year: 2019).*

Feng et al., "Open-Source License Violations of Binary Software at Large Scale," 2019 IEEE 26th International Conference on Software Analysis, Evolution and Reengineering (SANER), Hangzhou, China, 2019, pp. 564-568, doi: 10.1109/SANER.2019.8667977. (Year: 2019).*

Ahmed et al., "Towards an Ontology-Based Solution for Managing License Agreement Using Semantic Desktop," 2010 International Conference on Availability, Reliability and Security, Krakow, Poland, 2010, pp. 309-314, doi: 10.1109/ARES.2010.104. (Year: 2010).*

Perera et al., "Barrister-Processing and Summarization of Terms & Conditions / Privacy Policies," 2021 6th International Conference for Convergence in Technology (I2CT), Maharashtra, India, 2021, pp. 1-7, doi: 10.1109/I2CT51068.2021.9418090. ( Year: 2021).*

Jain et al., "Credit Based Micro Licensing Scheme for Digital Services," 2012 Third International Conference on Services in Emerging Markets, Mysore, India, 2012, pp. 37-43, doi: 10.1109/ICSEM.2012.13. (Year: 2012).*

Kraus et al., "Solution for Licensing of Software Modules in Automotive Industry," 2018 Zooming Innovation in Consumer Technologies Conference (ZINC), Novi Sad, Serbia, 2018, pp. 166-170, doi: 10.1109/ZINC.2018.8448697. (Year: 2018).*

Jebreen et al., "Understanding Feasibility Study Approach for Packaged Software Implementation by SMEs", arXiv:2012.10854, Dec. 20, 2020. (Year: 2020).*

Gomi, "Data and access management using access tokens for delegating authority to persons and software," Proceedings of the International Conference on Security and Cryptography, Seville, Spain, 2011, pp. 457-463. (Year: 2011).*

Extended European Search Report dated Apr. 15, 2020 for European Patent Application No. EP19208478.8.

* cited by examiner

SYSTEM AND METHOD FOR MANAGEMENT OF POLICIES AND USER DATA DURING APPLICATION ACCESS SESSIONS

CROSS-REFERENCE TO RELATED APPLICATIONS

This application claims the benefit of European Patent Application EP19208478.8, filed Nov. 11, 2019, and titled "System and Method for Management of Policies and User Data during Application Access Sessions," which is incorporated by reference herein in its entirety.

TECHNICAL FIELD

The present disclosure generally relates to the management of terms and conditions, as well as user consents, when accessing aspects of an application programming interface. More specifically, the present disclosure relates to a system and method for linking various policies to all or selected sub-products or sub-features of a larger service or program, as well as regulating third party access to user data resources as described by consent(s) accepted by the user.

BACKGROUND

The functionality provided by today's electronic services is increasing rapidly. More users are actively engaging with software products in their day-to-day lives. During these software exchanges, users often provide a wide array of data about themselves to the software provider. Unfortunately, such consumers also face the risk that their data may be exposed, particularly in cases where such data collection and use is not being securely managed. As awareness of such data breaches increases, companies must recognize that customers who no longer trust the company's software interfaces will also become reluctant to continue doing business with these companies.

In response to consumer concerns, governments have begun to place greater priority and importance on the legislation and enforcement of data privacy regulations. For example, the General Data Protection Regulation (Regulation (EU) 2016/679) ('GDPR') and the California Consumer Privacy Act of 2018 ('CCPA') both aim to guarantee strong protection for individuals regarding their personal data and apply to businesses that collect, use, or share consumer data, whether the information was obtained online or offline. The GDPR, which went into effect on 25 May 2018, reflects one of the most comprehensive data protection laws in the world to date. Like the GDPR, the CCPA's impact is expected to be global, given California's status as the fifth largest global economy. Previous regulations such as the Health Insurance Portability and Accountability Act (HIPAA), designed to provide privacy standards to protect patients' medical records and other health information provided to health plans, doctors, hospitals and other health care providers, and the Payment Card Industry Data Security Standard (PCI DSS) providing a set of security standards designed to ensure that all companies that accept, process, store or transmit credit card information maintain a secure environment, have also sought to protect consumers in more limited spheres of business.

These regulations aim to provide individuals with open access to and control over their personal data. For example, a consumer may be offered the ability to review what category of personal data will be collected about them by various groups and third-party organizations. Failure to provide these services can result in significant fines and loss of consumer trust. However, with the growing complexity of software applications in an ever-changing regulatory landscape, compliance to these rules by businesses can be both challenging and burdensome. While obtaining a user's consent is a common means of legally obtaining user data during the user's interaction with various applications, companies must now ensure that such consents—and other terms and conditions—accurately reflect the latest regulation for that country or state, as well as for the particular type of service that is being offered. Because applications are often multi-faceted product platforms offering a range of products and services, customers can be inundated by a plethora of policies that often are inapplicable to the particular service they will be using, but must be accepted in order for them to obtain access to the smaller subset of services they desire. Furthermore, companies do not yet have a way of managing these policies and regulations for their applications in a reliable, dynamic, or efficient manner.

There is a need in the art for a system and method that addresses the shortcomings discussed above.

SUMMARY

A system and method for management of policies and user data during application access sessions is disclosed. The disclosed system and method may include managing the presentation of terms and conditions and consents to users, and the recordation of the acceptance of such content, when enabling user access to features of an application. As noted above, the process of implementing data monitoring protections is complex, as companies and other organizations offering electronic services must handle the regulatory requirements of many different agencies. The following system and method solve the problems discussed above by offering a plug-and-play platform that readily enables compliance with such regulations, as well as providing real-time recordation of said compliance to allow for simplified demonstrations of accountability to regulatory agencies. As will be described below, embodiments of the proposed policy management service can be configured as an add-on service that may be readily integrated to a current client architecture and API manager and Identity Server product, with little to no changes required by the application provider. The service is integrated with existing front-end application (client or caller application) to enable comprehensive management over the lifecycle of user consents and terms and conditions. The service can be used to grant third parties (external entities) appropriate and limited access to the user resources once the user has provided the relevant consent. In addition, the policies created by an application provider can be configured to link to different app features based on the user role or client application type, permitting a customization of the policy for different groups of users or app types. The system is highly effective as it offers multi-tenancy management with the option to configure different policies for different tenants, enabling businesses or companies to reuse the same solution with different applications and clients while maintaining secure data segregation.

In one aspect, the disclosure provides a method for managing access by end-users to features of an application by use of a policy management service. The method includes receiving, from an application provider, a first policy, and also receiving, from the application provider, a first selection of a first feature of an application. The method further includes linking, in response to the first selection, the first policy to the first feature, and creating a first rule that requires acceptance of the first policy in order to obtain access to the first feature. In addition, the method includes executing the first rule, via an API manager for the application, such that access by an end-user to the first feature is enabled only if the first policy is accepted by the end-user.

In another aspect, the disclosure provides a system for managing access by end-users to features of an application through a policy management service. The system includes a processor and machine-readable media including instructions which, when executed by the processor, cause the processor to receive, from an application provider, a first policy, to receive, from the application provider, a first selection of a first feature of an application, and to link, in response to the first selection, the first policy to the first feature. The instructions also cause the processor to create a first rule that requires acceptance of the first policy in order to obtain access to the first feature, and execute the first rule, via an API manager for the application, such that access by an end-user to the first feature is enabled only if the first policy is accepted by the end-user.

In yet another aspect, the disclosure provides a non-transitory computer-readable medium storing software comprising instructions executable by one or more processors which, upon such execution, may cause the one or more processors to receive, from an application provider, a first policy; receive, from the application provider, a first selection of a first feature of an application; link, in response to the first selection, the first policy to the first feature; create a first rule that requires acceptance of the first policy in order to obtain access to the first feature; and execute the first rule, via an API manager for the application, such that access by an end-user to the first feature is enabled only if the first policy is accepted by the end-user.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
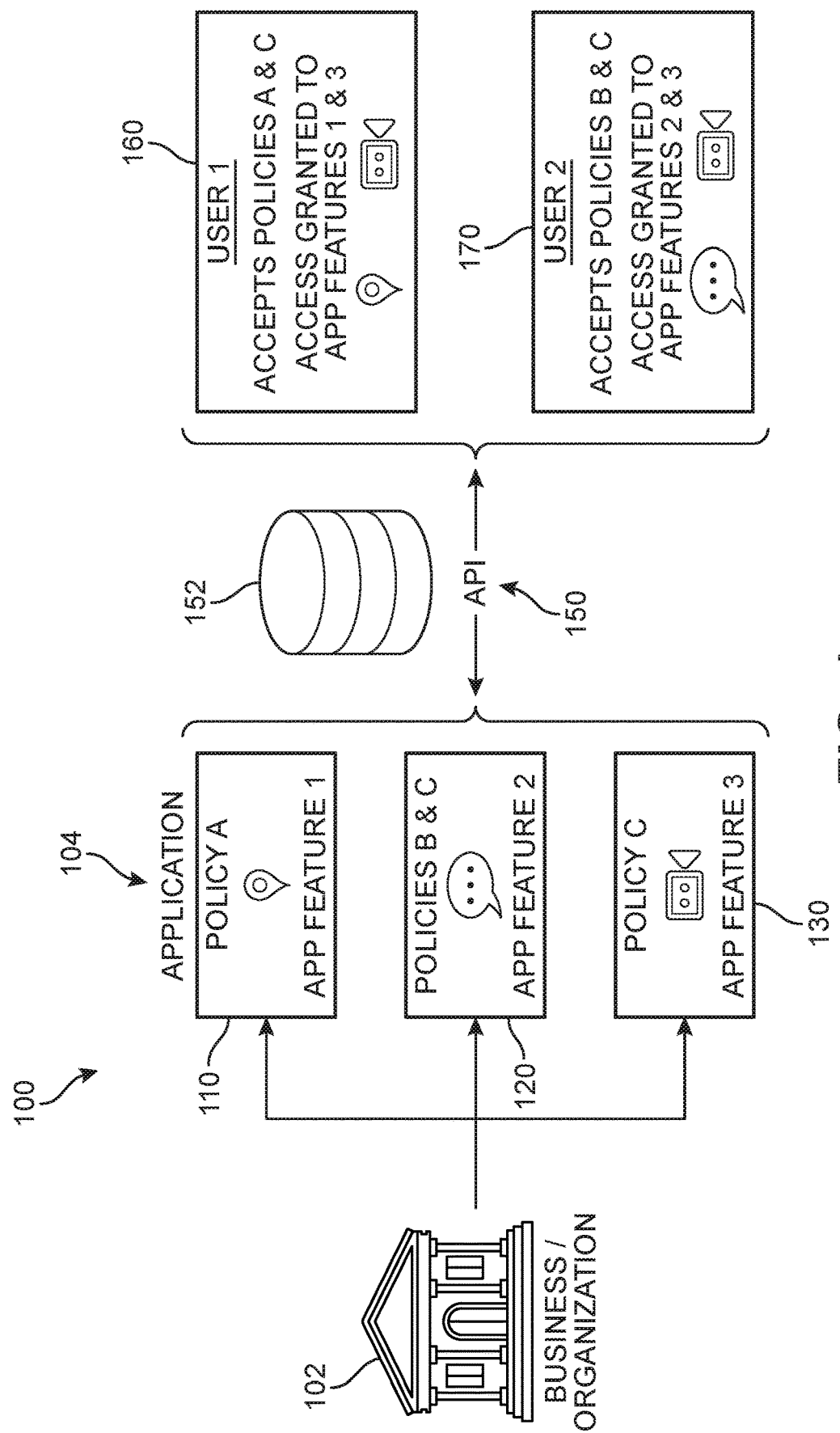
FIG. 1 illustrates an overview of an application feature and policy management system, according to an embodiment.

The embodiments provide a method and system to manage the presentation of terms and conditions and consents to users, and recordation of the acceptance of such content, when enabling user access to features of an application programming interface (API). As noted earlier, data protection laws such as the GDPR, PCI, HIPAA, and CCPA have been enacted to protect the personal data of users and restrict the collection and processing of such data. Each set of these laws define a set of rules about how companies should process the personal data of data subjects, and the requirements of each set of rules can differ. The process of implementing such protections is complex, as companies and other organizations offering electronic services must handle these regulatory requirements efficiently and comprehensively to ensure compliance as well as to promote customer trust and loyalty. The following systems and method offer a plug-and-play platform to facilitate compliance with such regulations and enable continuous recordation of said compliance to allow for simplified demonstrations of accountability to regulatory agencies.

As will be discussed in detail below, the proposed systems and methods offer an 'out of the box' management experience configured to enable the assignment or pairing of one or more policies to a specific feature of an application as well as provide options for lifecycle management of such policies. For purposes of simplicity throughout this disclosure, both "terms and conditions" and "consent(s)" will be referred to collectively herein as a "policy" or "policies". Generally, terms and conditions should be understood to refer to a legal agreement describing one or more rights that the application provider ("app provider") asserts and that the end-user must accept in order to obtain access to that application, while consent refers to an agreement that serves as a legal basis for the application provider to collect and use personal data.

Different embodiments of the proposed system will allow API providers to easily and intuitively (a) create, upload, or update their own policies that are to be accepted by an end-user in order to consume the service(s) being provided, for example via an editorial interface; (b) define consent as being applicable to a specified service area or region, by product or service, and/or by the end-user's access role or position; (c) define rule(s) to link to the response to the policy(s) (i.e., acceptance or rejection) by an end-user; (d) collect and access historical data of the user responses and/or any updates and modifications of the policies for purposes of recordkeeping and auditing; (e) embed a plug on the client device's user interface that enables the user to view and accept the policies; (f) access a personalized user interface section where the user can review, accept, and modify policies and view personal information relating to them and the service being provided; (g) manage the large-scale loads of policies as they are accepted across different access channels; and/or (h) enable access to third-party systems to select categories of user data (once the user has given the specific consent). In some embodiments, the data collection by the application and/or usage of such data by third-parties can be regulated by the management system to permit strict controls over how often and/or how many times the data is used or collected, how much data is collected, the types or categories of data being collected, as well as for what purposes. The system is configured to offer functionality across both web-based access points as well as most front-end interfaces (e.g., mobile apps, computing devices, etc.) that are interacting via the API with the management platform, as well as offer API providers the ability to define acceptance of their policies such that the acceptance is inherited by secondary users and entity-owned devices, as well disable service access until the specific consent required for that service is accepted by the user.

In order to introduce the reader to some of the proposed embodiments, FIG. 1 illustrates an example 100 in which the management of multiple policies linked to different features or services of an application ("app") 104 using a management system 152 is being implemented. In this case, an API provider such as a business or organization entity ("entity") 102 has accessed the management system 152 and, for example via a web-based user interface, uploaded a plurality of policies (here labeled as Policy A, Policy B, and Policy C) and assigned one or more of these policies to each feature of the app 104. In FIG. 1, the app 104 includes a first feature 110 (such as a map navigation service) that has been linked to Policy A, a second feature 120 (such as a chat message service) that is has been linked to both of Policy B and Policy C, and a third feature 130 (such as a video editing service) that has been linked to Policy C. In other words, in order to receive access to one or more of first feature 110, second feature 120, or third feature 130 of application 104 that is provided by entity 102, an end-user must accept the policies that have been linked to that feature. The specific relationships between feature and policies can be easily updated and reviewed by the entity 102 through use of the management system 152.

In FIG. 1, a customer, such as a first user 160, initiates a usage (or access) session by accessing a welcome or logon interface associated with the application 104 and managed or offered via API 150. The API 150 can communicate with and make use of the resources of the management system 152 to determine if the first user 160 is permitted to receive the requested services based on the policies that have been accepted by the first user 160. In other words, during the registration process for new users of the API, the users will be presented with one or more policies for acceptance. In order to be added to the directory of active or registered users, one or more policies will have been accepted by the user, thereby granting him or her the credentials necessary for accessing the API. Though the initial registration process is not depicted in the drawings, it can be appreciated that for these users to interact with the various features of the API, one or more of a consent and/or terms and conditions were accepted and stored in association with the user's account or profile.

In this case, the first user 160 wishes to obtain access to first feature 110 and third feature 130 for the first time. In response to this selection, the API 150 presents first user 160 with a policies 'portal' that can display to first user 160 the content of Policy A and Policy C. The content of Policy B is not presented to first user 160, because neither first feature 110 nor third feature 130 have been assigned Policy B, and so do not require acceptance of Policy B in order to proceed to their corresponding services. First user 160 may be pleased by the reduction in review time, as well as policy content that is more aligned to their intended use of application 104.

Similarly, a second user 170 initiates a usage session and attempts to obtain access to all three features. When presented with each of Policy B and Policy C, the second user 170 registers an acceptance of the content. However, upon presentation of Policy A, the second user 170 does not agree with the displayed content, and rejects Policy A. In response to these input events, the management system 152 works with API 150 to restrict access by the second user 170 to only second feature 120 and third feature 130, while also blocking access to first feature 110 (which required acceptance of Policy A). In some embodiments, this type of block can be configured at the API service level.

As noted above, the use of the word "policies" encompasses the meanings attached to both "terms and conditions" and "consent(s)". For purposes of this application, the phrase "terms and conditions" refer to an agreement that establishes a legally binding relationship between the application provider and the end-user. The terms and conditions set forth clauses that embody the rules, requirements, restrictions and limitations that a user must agree to in order to use a given app. For example, one or more terms and conditions in an agreement can explicitly outline (a) the retention of rights of ownership or ban on Infringement; (b) the retention of the right to change the app at any time; (c) the restrictions on app abuses; (d) disclaimer of warranties and liabilities; (e) the retention of the right to terminate or ban users; (e) definition of key words; (f) user rights and responsibilities; (g) proper or expected usage of the app; (h) intellectual property protection; (i) accountability for actions, behavior, and conduct; (j) payment details for purchases made through the application; (k) disclaimers and warranties; (l) procedures for account termination; (m) exclusions or limitations of liability; and/or (n) user notification upon modification of terms. If a user accepts a policy describing one or more terms and conditions, the user is granted his or her own access to the designated service.

Furthermore, if the application is also designed to collect, use and/or share information or metadata from a user's computing device, such as geolocation data, contacts, text messages and call information, the provider may implement an embodiment of the proposed systems to ensure the appropriate consent is captured from the end-user. Consent as a type of policy for purposes of this disclosure refers to an agreement that serves as a legal basis for the application provider to collect and use personal data, as well as to share that data with third parties and permit those third parties to use the data. The consent identifies the processing activities that are to be carried out with respect to a users data, and what aspects or specific data resource associated with the user will be collected if a user decides to access the application. In other words, consent typically describes the privacy policy that the application will adhere to when it collects a user's data, an overview of all data collections streams and third party software associated with the application, an overview of all collected data, and/or serves as a request for permission to access sensitive user data such as location, personal information, etc. If a user accepts a policy describing a type of consent, the platform will be configured to enable external third parties to access user resources stored by the platform.

Figure 2:
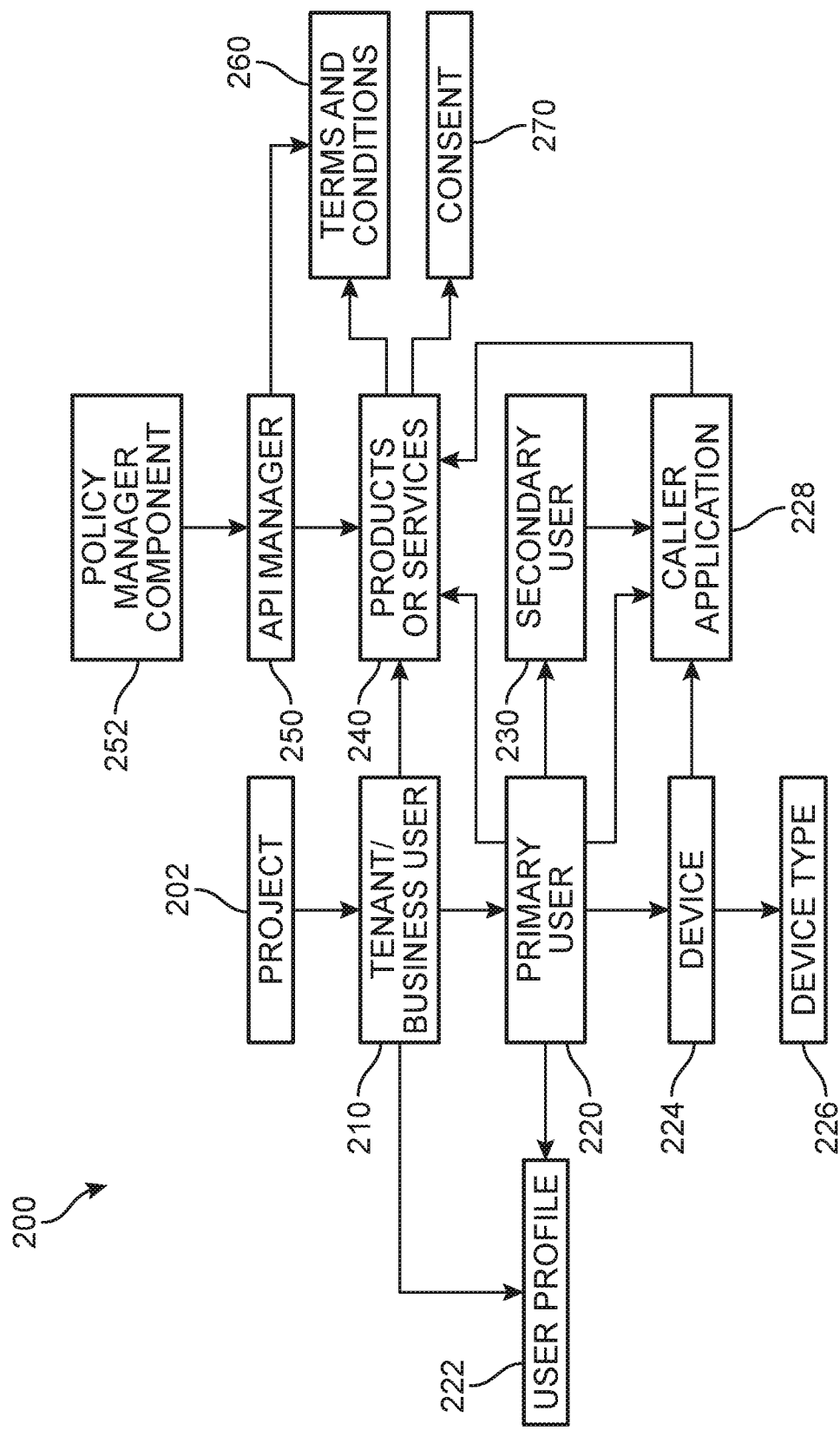
FIG. 2 is a schematic flow diagram of an embodiment of a process of offering end-users access to a service associated with an application programming interface.

In FIG. 2, a flow chart depicting an overview of a process 200 of managing policies for an API is shown. As noted above, one or more policies (optional or mandatory) can be associated or linked to a feature for an application. In some embodiments, a tenant 210, such as a business or other organization, may determine that specific app products or services 240 offered by a particular API provider or manager 250 are needed. For example, specific app products or services 240 may be needed for a project 202 or other endeavor. A policies manager component 252 can be implemented to enable the API manager 250 to manage the entire life cycle of the policies that have been assigned to the app features. The tenant 210 can register for the service and be assigned or associated with a unique ID for the project, and the policies manager component 252 will define a particular set of policies that are applicable to the project 202 and/or other characteristics of the tenant, such as the location or region in which the tenant 210 is located, the type of organization that tenant 210 is operating, the number of users, or other such details.

The tenant 210 may itself represent a primary user 220 of products or services 240, or the tenant 210 may include a plurality of primary users that may be participants of the project 202 and who will each be required to accept one or more policies (such as terms and conditions 260 and consent 270) in order to access products or services 240 offered by API manager 250. Each primary user 220 may create, generate, upload, or otherwise link a user profile 222 to the platform that will be used to identify the user, verify user credentials to log into the platform, and record any responses such as acceptance or rejection of policies for that user in a database. In addition, in some embodiments, the user profile 222 can define a language, country, and/or an identity access management (IAM) group. Furthermore, in different embodiments, a user's profile may vary depending on their language, country, or IAM group. As an example, while maintaining the same IAM group mapping, the profile for a single user can be different depending on the country in which the user accesses the API. This reflects the understanding that regulations may differ widely from one country to another.

In addition, the tenant 210 and/or primary user 220 may specify permissions for multiple users, in order to facilitate the management of the permissions for those users. A common example includes identifying an IAM group for admins, and assigning that group the types of permissions that administrators typically need. Any user in that group will then automatically have the permissions that are assigned to the group. If a new user joins the organization and needs administrator privileges, the process of assigning the appropriate permissions occurs by simply adding the user to that group.

Once the primary user 220 has accepted the requisite policies (terms and conditions 260 and/or consent 270) that were necessary for access to the selected products or services 240, the API manager 250 can be configured to communicate with the policies manager component 252 to determine whether the primary user 220 is to be permitted subsequent access sessions to products or services 240. The primary user 220 can then access products or services 240 via a caller application 228 that serves as the interface with products or services 240.

Furthermore, in some embodiments, the API manager 250 can indicate whether the acceptance of the primary user 220 should also enable a secondary user 230 to access the platform. For example, in some cases, the primary user may be the account owner who delegates or otherwise permits other users to access products or services 240 (e.g., via permission settings in their user profile 222). Such a secondary user 230 can access products or services 240 on behalf of the primary user 220 without requiring a separately recorded agreement of the policies (terms and conditions 260 and/or consent 270). In other words, the agreement provided by the primary user 220 serves as a proxy for the access granted to the secondary user 230, and the secondary user 230 inherits the benefits of the primary user's agreement, even if the secondary user 230 creates their own account. Some examples of secondary users include family members, employees, coworkers, or other persons who are authorized by the primary user 220 to log into the application.

In addition, in some embodiments, the primary owner 220 may own or possess a computing device ("device") 224 that is used to access products or services 240. The device 224 can be typified by a device type 226 similar to a profile for that device 224 that identifies the device 224. The policy manager component can link the primary user's acceptance of the terms and conditions 260 and/or consents 270 to the device type 226, such that subsequent sessions of the caller application 228 from the device 224 will automatically apply the previously recorded agreement, whether the user of the device 224 is the primary user 220 or another user, as it can be assumed that anyone using device 224 is doing so with the authorization of primary user 220. In other words, acceptance of a policy can be linked to a user and to a user device. The device may access a service by leveraging its own credential that differs from the user's credentials.

Figure 3A:
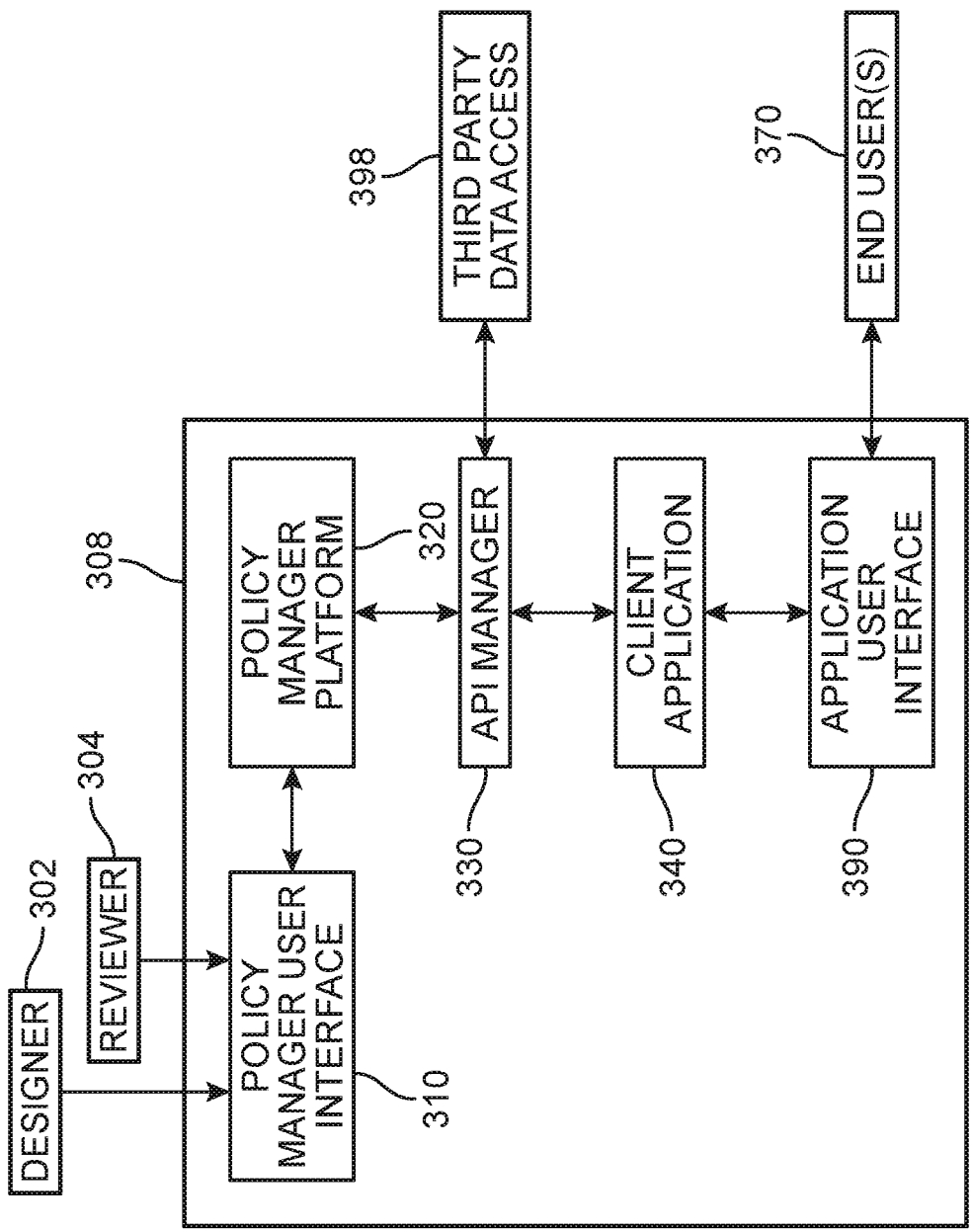
FIGS. 3A, 3B, 4, and 5 are schematic diagrams collectively representing an embodiment of an application feature and policy management system.

As an introduction to some aspects of the proposed embodiments, FIG. 3A illustrates a high-level overview of one example of a policy and API service management system ("system") 308. The various components of system 308 will be discussed in greater detail with reference to FIGS. 3-5 below. In FIG. 3A, application providers and managers such as policy designers 302 and reviewers 304 for a business or organization can interact with the policy management platform 320 via a policy manager user interface 310. The selections made and/or content added or modified through the policy manager user interface 310 can be conveyed to an API manager 330 by the policy management platform 320. The API manager 330 is generally configured to oversee the process of creating and publishing web application programming interfaces, enforce their usage policies, control access, nurture the subscriber community, collect and analyze usage statistics, and/or report on performance. Thus, the operation of the API manager 330 can be in part shaped by the rules generated by the policy management platform 320. The effects of this partnership may be observable to end-users 370 when they attempt to access one or more features of a particular application via an application user interface 390, as the policy management platform 320 manages the various policies that a user must review and accept before access to the desired features will be granted. Similarly, third party data access 398 can also be carefully regulated and monitored via the API manager 330 in accordance with policies applied by the policy management platform 320.

Figure 3B:
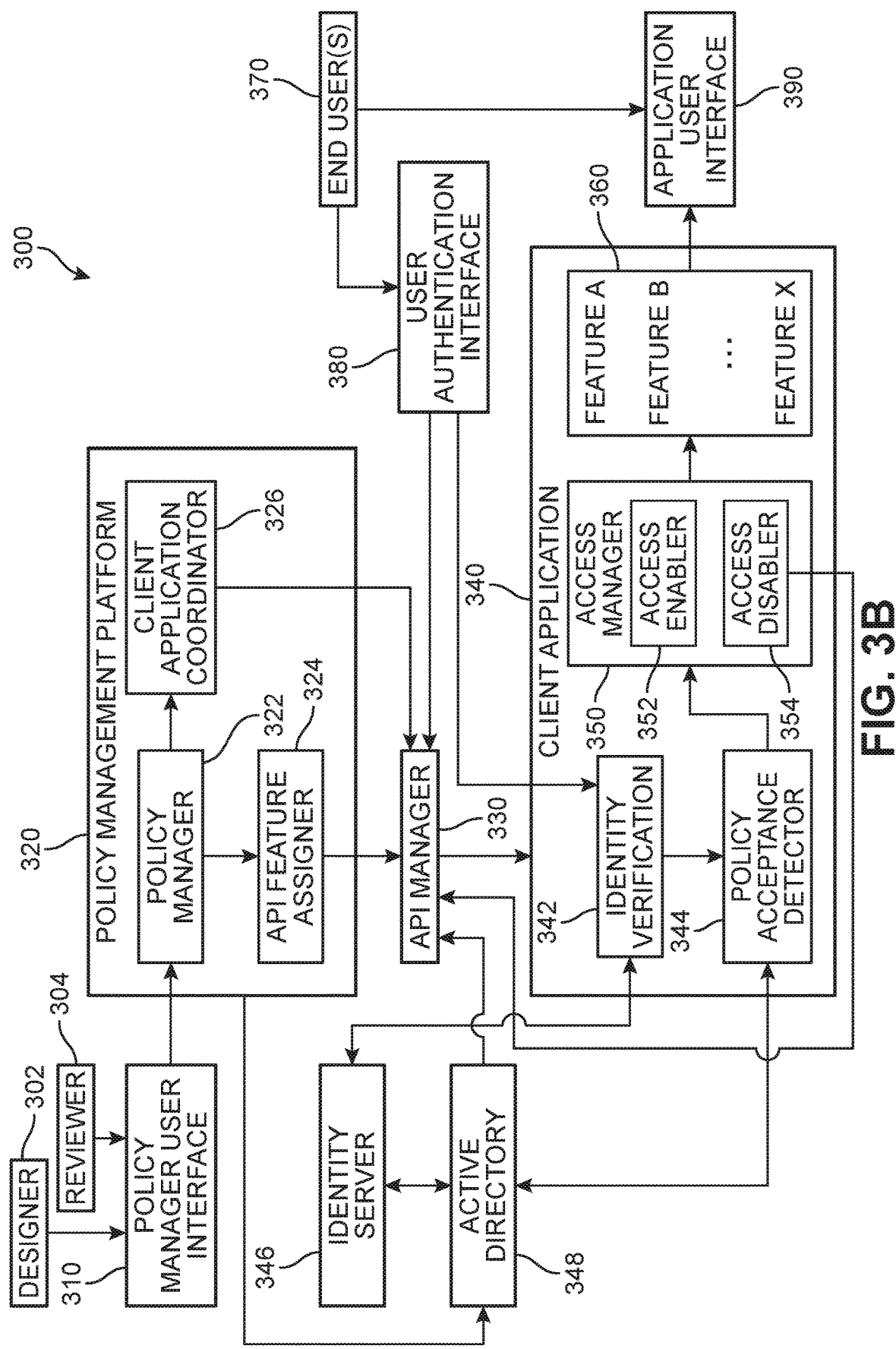
Figure 4:
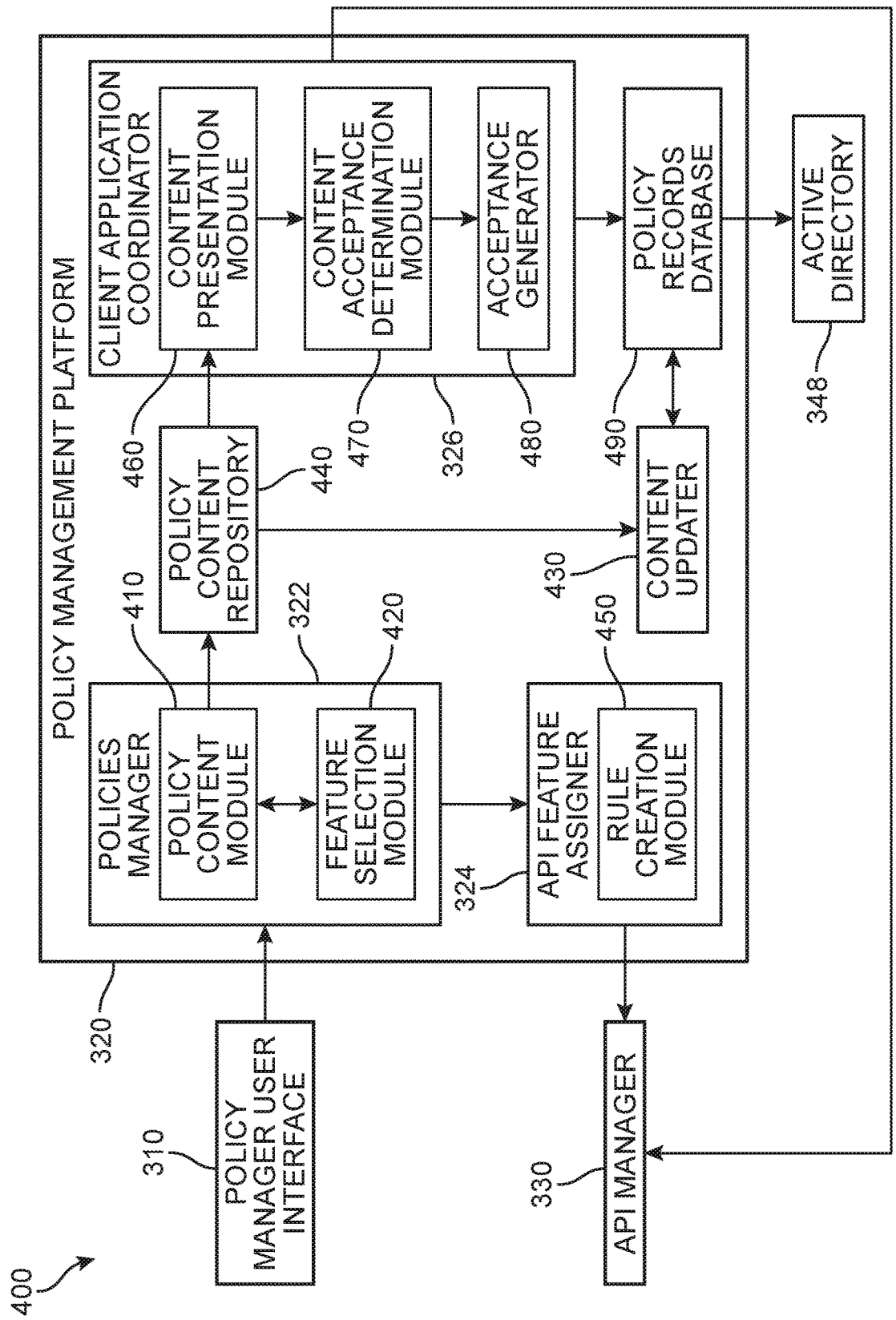
Figure 5:
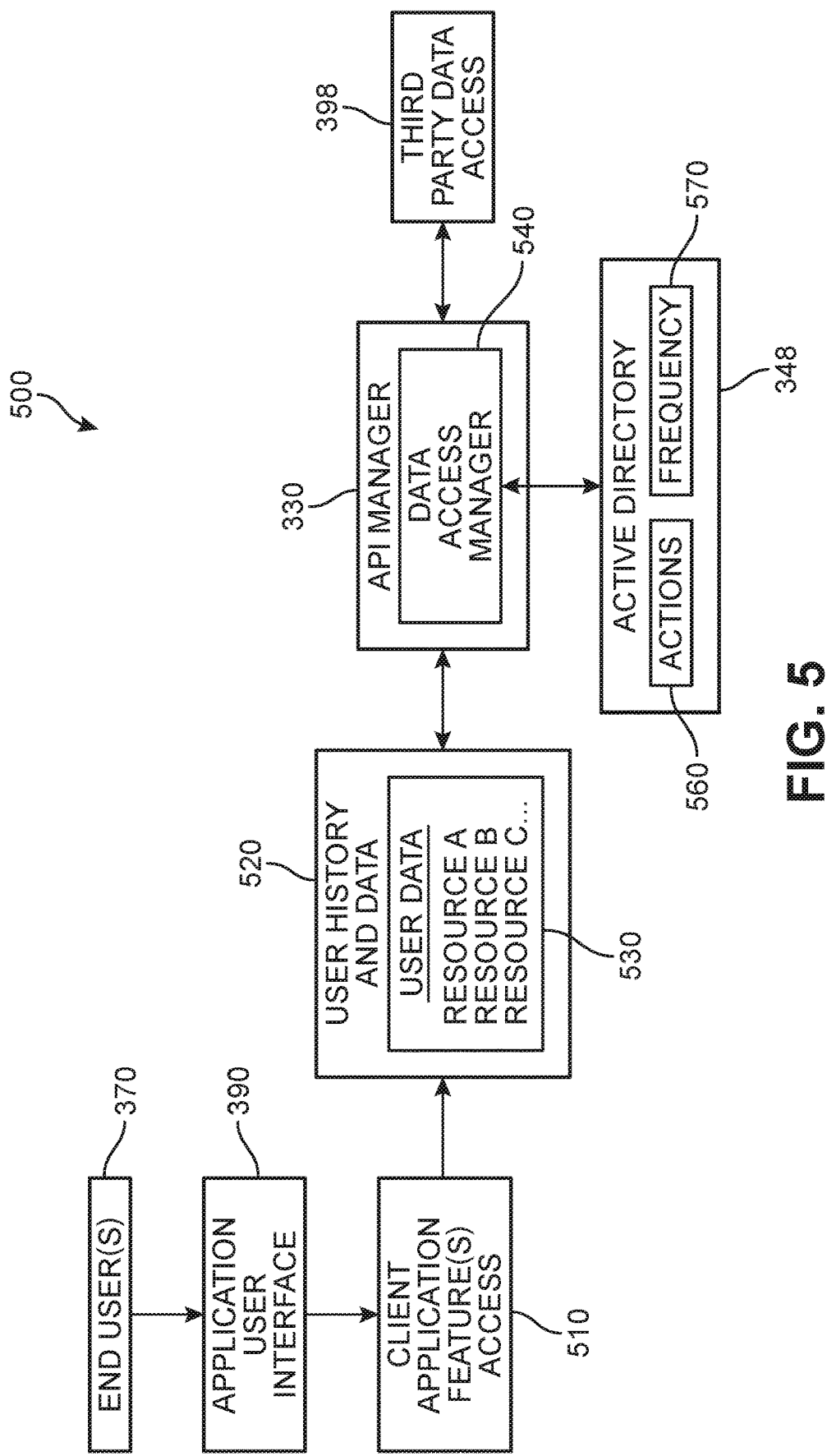

Referring now to FIGS. 3B, 4, and 5, a series of more in-depth schematic diagrams representing portions of the system 308 of FIG. 3A are presented. In a first system portion 300 shown in FIG. 3B, one example of the general flow of information and services in the system is shown. In this diagram, a designer 302 can log into a policy manager user interface 310, create or update a specific user profile (for example, with a unique tenant ID, enterprise ID, application name, IAM group, etc.) and identify one or more policies that will be linked to this particular application and/or to the user profile. Thus, if a user profile indicates the user is located in a first country that has a regulation whereby a first policy must be accepted, the user profile will be linked to a requirement that the user accept the first policy. If the content reflects a terms and conditions policy-type, the content can include attributes such as, but not limited to text (e.g., legal text describing the terms and conditions), a selection indicating whether acceptance of the policies are mandatory or optional, language (indicating the language in which the text of the term and conditions is written), and/or country (indicating the country in which the terms and conditions are valid). In embodiments where the content is a consent policy-type, the content can include attributes such as, but not limited to text (e.g., legal text describing the consents), whether the validity of the consent is recurring (indicating if the consent is valid recursively or only once), how often data may be collected or used (i.e., frequency per day indicating how many daily access instances have been consented to, which may be particularly useful for data that is changing frequently, such as user location), consent expiration date (indicating the date on which the consent, even if accepted, will no longer be valid), language (indicating the language in which the text of the consent is written), country (indicating the country in which the consent is valid, resource (indicating the resource for which the end-user is giving consent to a third party to access), and/or action (indicating the action that the third party can perform on the end user's resource following a user's acceptance of the consent).

In some embodiments, the inputted information by the designer 302 are created and/or uploaded and automatically stored in a 'draft' state, until the designer 302 moves the content into a 'to be reviewed' state. In a next stage, a reviewer 304 for can log into the policy manager user interface 310 and can retrieve one or more app features and/or policies listed that are categorized under the 'to be reviewed' state. The reviewer 304 may then edit, update, publish, or reject the content. Thus, in some embodiments, the creation process can include a review and validation step before publication. When a new policy is published, or an existing one is updated, it is automatically presented (or refreshed) to end-users at the first login after the most recent publication event, for example via a policies acceptance portal, or in conjunction with their standard login mechanism and/or process.

In some embodiments, if a policy published by a reviewer is identified as mandatory, a back-end manager (see FIG. 6) for the system can invoke the API manager to create an eXtensible Access Control Markup Language (XACML) policy coherently. For example, the various features provided by the API can be grouped by category and the XACML can be configured to enable access only to a subset of service that is assigned to a specific policy ID that was accepted by the user.

In different embodiments, the policy manager user interface 310 can serve to convey the various API provider inputs in which various policies are assigned to selected application features to a back-end policy management platform ("policy management platform") 320 via a policies manager 322. Thus, a policy can be linked to a specific subset of an API or full access to all API published for that application. The policies manager 322 receives and processes this information for use by an API feature assigner component ("API feature assigner") 324 and client application coordinator 326, as will be discussed further with reference to FIG. 4 below.

The API feature assigner 324 identifies the pairing or link between a policy and a specific feature of the application and submits the policy to the API manager for implementation during attempted access of the selected feature by a user, with the help of client application coordinator 326. The client application coordinator 326 will also receive information from API feature assigner 324 to prepare the content for presentation by a client (caller) application 340 that is used by end-users 370 for requesting and obtaining access to one or more features of the application. Such access requests may be submitted via a user authentication interface 380 presented on a computing device display, such as a mobile phone, laptop, or other computing device. As end-users 370 log into client application 340 and select the features they wish to access, an identity verification module 342 can receive the user credentials and determine, through communication with an identity server 346, whether the user has previously registered for or used the service currently requested, for example by reference to an active directory 348. The active directory 348 includes information for each user identity that indicates whether the user has previously accepted the policies that are required for access of the requested feature, as described above. In such cases, the API manager will have generated and stored in the active directory a record of one or more acceptances for any number of policies for that user. If the user identity is determined to include a record of the requisite policy acceptance, a policy acceptance detector 344 can trigger or otherwise permit access by communication with an access enabler 352 of an access manager 350 associated with the client application 340. The access will be enabled only with respect to those features 360 that are linked with policies that have been verified as having been accepted by the current user account (e.g., Feature A, Feature B, . . . Feature X, etc.). These features will be presented and/or made accessible via the application user interface 390. If the user identity is not associated with all of the necessary acceptance identifications, the policy acceptance detector 344 can trigger or otherwise block access of the selected feature(s) via an access disabler 354 of the access manager 350. It should be understood that in different embodiments, some or all of the activities of client application 340 can be included in and/or configured and managed by API manager 330.

Furthermore, in some embodiments, if an end-user is not associated with an acceptance record for a policy, perhaps because this is the first time this user is attempting to access a particular feature, the policies have been updated or otherwise modified, or the policy was previously rejected, the end-user may be provided with a presentation of the policies (such as the terms and conditions and/or consent content) that, if accepted, will generate the necessary record, for example, via client application coordinator 326, and thereby enable access for the desired feature. This may occur in response to a command or other data sent from access disables 354 to API manager 330, which may be configured to present a policy acceptance portal interface to the end-user.

For purposes of clarity, additional details are provided with reference to FIG. 4 regarding the policy management platform 320 with a view of a second system portion 400. In FIG. 4, the policy management platform 320 has been expanded to reveal additional modules and operations. The policies manager 322 is seen to further include a policy content module 410 and a feature selection module 420. The policy content module 410 is configured to receive and process the data submitted or generated via policy manager user interface 310 corresponding to the content and attributes of any published policies, and the feature selection module 420 is configured to identify the specific subset of the API, or the entire API, that has been selected for pairing with the specified policy content by the API provider.

Furthermore, a policy content repository 440 can receive the data from the policy content module 410 to ensure a copy of the policy content, including any text and attributes, is available for later viewing and/or auditing purposes. In some embodiments, a content updater 430 can determine whether the policy is not new but instead reflects an update or other modification, in order to update a policy records database 490, and also maintain a record of all versions of a policy. Following a change to a policy, the content updater 430 may also be configured to update the records for all users in a policy records database 490 who had previously accepted the original policy in order to maintain an accurate directory of permissible users and reflect the fact that the acceptance of those policies is no longer applicable or valid. This can occur in real-time to ensure any subsequent auditing will also be up to date. In response, the policy record database 490 can be configured to transmit a signal to the active directory 348 to 'reset' the interface and initiate, at the client application 340 (see FIGS. 3A and 3B), a new (refreshed) presentation of the updated policies upon the user's next access attempt of the app feature(s) linked to the updated policy. In other words, the policy records database 490 can update the active directory 348 in order to ensure that those users who had previously accepted policies for a particular feature are now blocked until they accept the necessary updated policies.

In addition, the API feature assigner 324 is configured to receive the pairing information from the policies manager 322 that identifies the policies that are assigned to a particular application feature. This information is used to create a rule, via a rule creation module 450, that will ensure the two will be linked and that a request by a user for access to the linked feature will trigger a corresponding presentation of the linked policies (unless the policies have been previously accepted by said user as indicated by the active directory 348). In some embodiments, the user can also be given an option to review the set of policies that he or she has previously accepted and/or rejected, as well as policies that have not yet received a response. The rule is shared with the API manager 330 which, in conjunction with the client application coordinator 326, will implement the appropriate policy presentations and access. For example, a content presentation module 460 can be triggered to display the policy content to a user when a feature is being accessed for the first time since being assigned a newly published or updated policy, and/or when policy acceptance detector 344 (see FIG. 3B) determined the current user previously rejected the policy and activated or triggered the access disabler 354 (see FIG. 3B). A content acceptance determination module 470 can then verify whether the presented content has been accepted, and generate an acceptance record via an acceptance generator 480 that will be used to update the policy records database 490 as well as the active directory 348, and enable access to the feature via access manager 350 of client application 340 (see FIG. 3B). For example, when a user accepts a mandatory policy, the relevant access policy acceptance identifications are 'written' on the active directory as user attributes.

Thus, when a user requests access to an API feature, the API manager 330 can retrieve from the active directory 348 the user attributes that are needed to evaluate the XACML policy. The API manager 330 verifies if the user has accepted mandatory policies for the application features to which the user is requesting access. If the verification is successful, the API manger 330 forwards the request to the access manager. If the verification fails, the API manager 330 provides a "not authorized" response such that the user can only access presentation of the content of policies associated with the desired feature, rather than the app feature itself.

As noted earlier, in different embodiments, the system is also configured to manage the lifecycle of consent that is associated or linked to a specific end-user resource or set of end-user resources. In FIG. 5, a third system portion 500 illustrates an example of the mechanism by which third party or other collection and/or access of user data may be protected and/or regulated by the proposed system. In this example, end-users 370 may attempt to access one or more client application features 510 via the application user interface 390. The client application, which may be cloud-based, invokes the policy management platform (via the API manager) to determine whether there are policies (such as consents to third party access) that are to be approved. If the end-user reads the consent text and accepts the use actions and frequencies, a consent acceptance ID is returned to the client application.

During their access sessions of the selected features, users may generate or be associated with user history and data, or simply "data" 520. The data is classified into specific categories of user data resources 530, each being protected as a separate user asset. Thus, access to such data 520, for example via third party data access 398, can be strictly policed and managed by a data access manager 540 of the API manager 330, which will review the user attributes recorded in the active directory 348 that specify what policies have been accepted by this user.

In addition, the API manager 330 can refer to a Consent Policy Manager to determine what actions may be taken for this user's data and how often such actions may occur based on such accepted policies. For example, a third party such as an external back-end service associated with a marketing campaign may request access to a resource such as the user's last position or other user location or application usage tracking to enable a more focused geolocation-based message to that user. If the user consented to such a use of his or her own data, this will be reflected in actions 560, which will then refer to frequency 570 to determine at which time or occasion this specific access may occur. This information ensures that the API manager 330 will appropriately limit, restrict, and/or filter the type and amount of user data that is shared with a third party. It may be appreciated that in some embodiments, in order for a third party to access a user's resources, the back-end system that manages the end user's resources will be extended to accept consent-type access records as an additional HTTP authorization header to grant access to specific data. Furthermore, the back-end system should be integrated with the policy management platform for the validation of the access records that will be used by the external system to access an end-user's resource with specific actions, and can thereby filter the information so only the proper data is sent.

Figure 6:
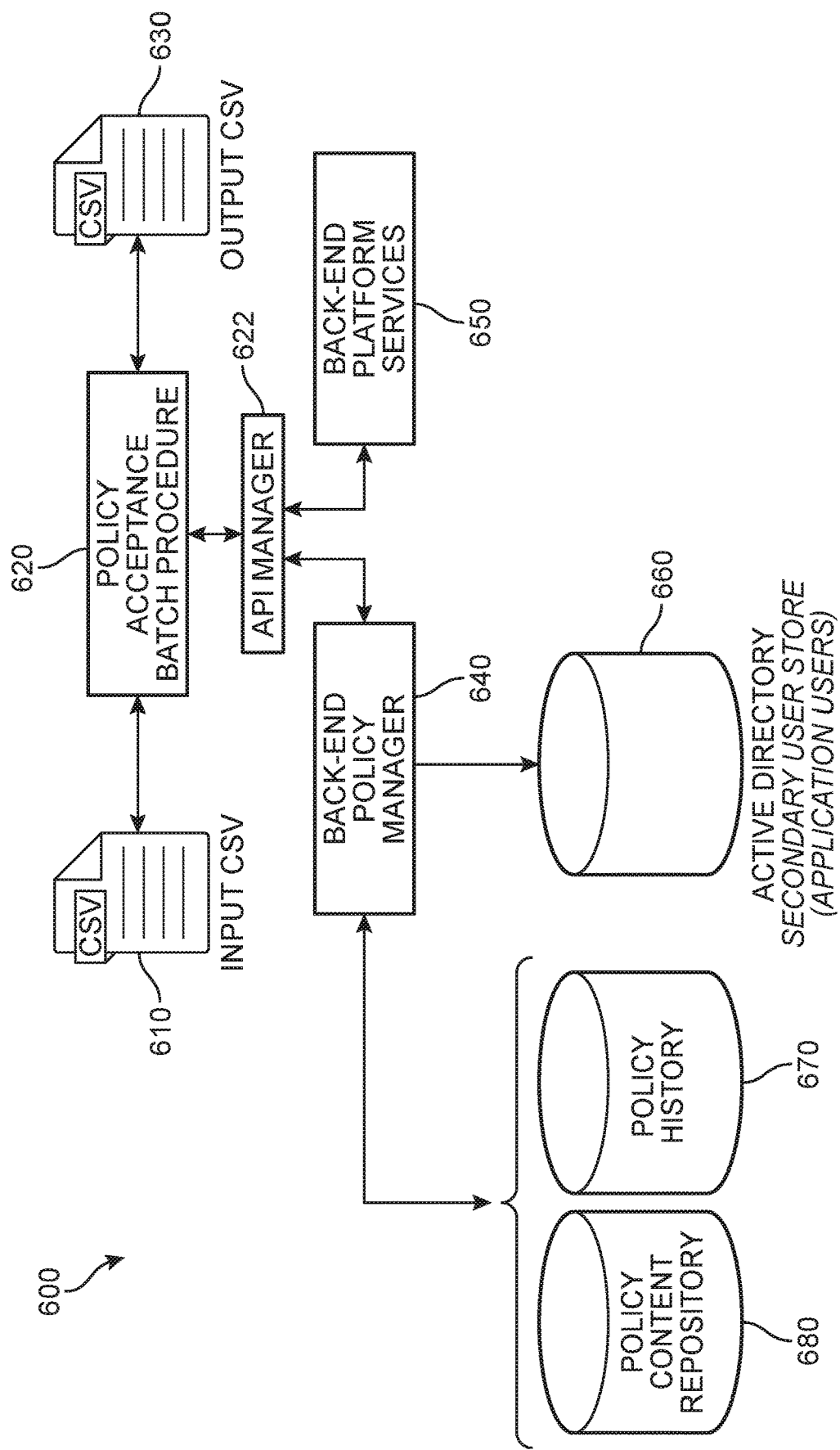
FIG. 6 is a schematic diagram of a flow of general inputs and outputs for a terms and conditions and consent database, according to an embodiment.

Referring now to FIG. 6, a flow diagram illustrating an example of the management of the loading and recording of accepted policies by users in the active directory is shown. In this diagram, an input file 610 such as a .CSV file that includes a list of policies accepted or rejected by a group of users associated with an external channel is passed to a policy acceptance batch procedure 620. The policy acceptance batch procedure 620 validates the format of the input file 610 to exclude formally incorrect or incomplete requests from processing. Furthermore, the policy acceptance batch procedure 620 invokes back-end platform services 650, for example via API manager 622, to determine whether a user (or device entity, as discussed in FIG. 2) from whom a response to a policy is to be accepted or rejected exists in the platform. In addition, the policy acceptance batch procedure 620 can invoke back-end policy manager 640 to initiate presentation of a policy as needed (with reference to policy history 670), and also to store the accept or rejection of a policy in policy content repository 680. The back-end policy manager 640 can further align active directory 660 to maintain an up to date record or identification of all policies that have been accepted for each user identity. Finally, the policy acceptance batch procedure generate an output file 630 (such as a CSV file) that includes the outcome of the processing of each request included in the input file 610.

As noted earlier, the system can be configured to provide a user interface or policy management portal to visualize a current record of the policies that have been accepted by the user, the text of the policies, and/or to authorize their publishing across different services. In some embodiments, the portal can be accessed as a web-based plugin and is embeddable across different applications. For example, a web-based plugin can refer to a widget embedded by or in a client application that displays and manages the consents for the user. In different embodiments, a policy content visualization tool may be accessed via a user interface for the management system (see policy manager user interface 310 in FIGS. 3A and 3B). Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

Figure 7:
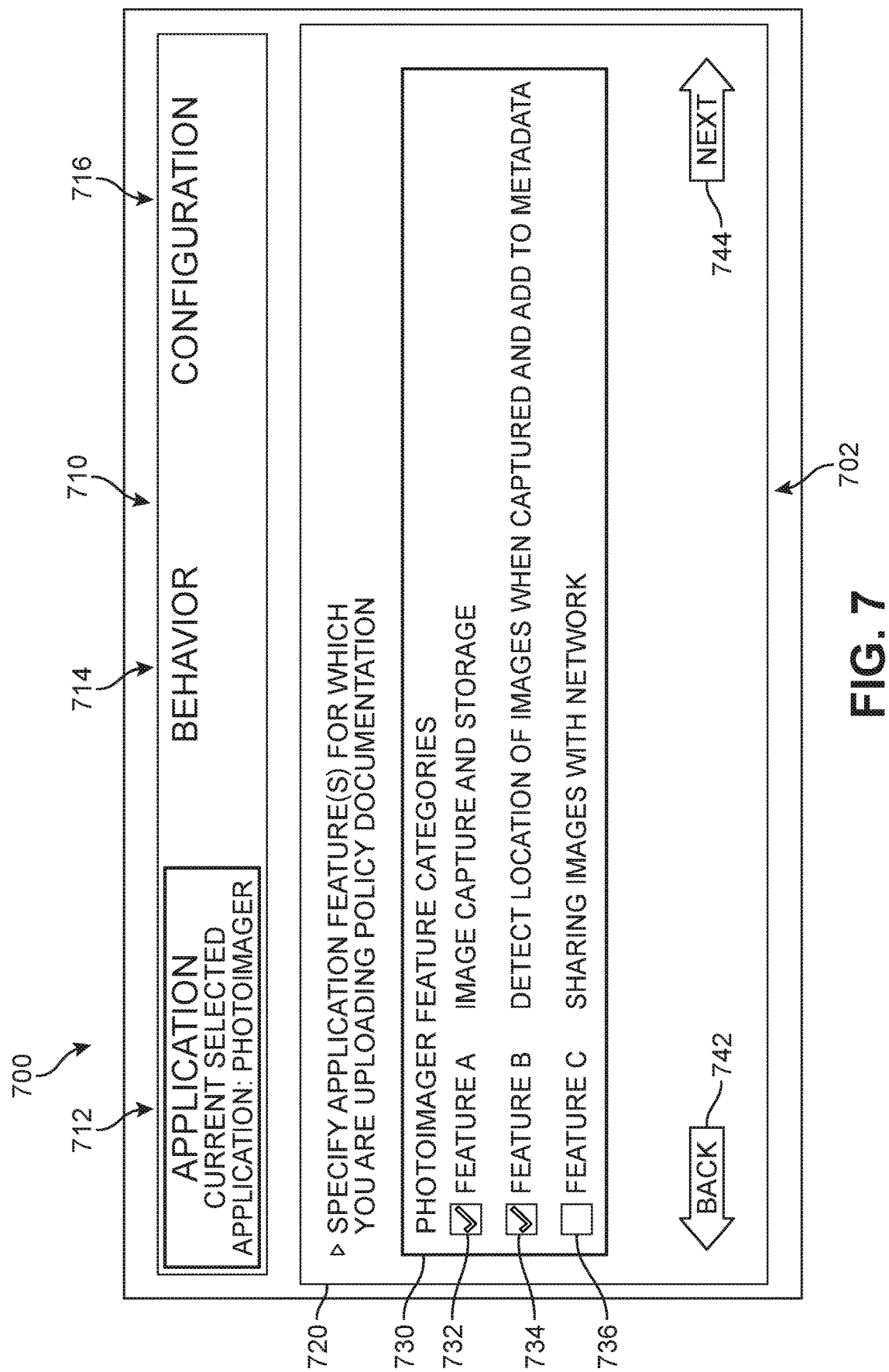
FIG. 7 illustrates an example of a user interface for management of application features and policies in which a designer may select one or more features of an application according to an embodiment.

For purposes of illustration, an example of a policies management and editorial portal ("portal") 700 is described with reference to FIGS. 7-9. The portal 700 includes three channel options 710, including a first option 712 ("Application"), a second option 714 ("Behavior"), and a third option 716 ("Configuration"). In FIG. 7, the portal 700 is open or displaying a first policies manager user interface ("first interface") 702 associated with the first option 712. The first interface 702 allows the admin of an API (such as a designer or reviewer) to initiate the consent upload or assignment process by selecting the application portions, sections, or services (i.e., features) that will be linked to some policies. In a first header section 720 ("Specify application feature(s) for which you are uploading policy documentation") the user may be shown instructions or information about the currently selected channel based on the API that is being managed (here, a generic 'PhotoImager' type application). Simply for purposes of example, some feature categories are identified in a selection section 720, including a first selectable option 732 ("Feature A—Image Capture and Storage"), a second selectable option 734 ("Feature B—Detect Location of Images When Captured and Add to Metadata"), and a third selectable option 736 ("Feature C—Sharing Images with Network"). The admin may select the features for which they wish to establish a policy-feature relationship. In this case, the admin has selected first selection option 732 (Feature A) and second selectable option 734 (Feature B). These selections will be carried forward as the admin proceeds to the next step, either via navigation options (e.g., a 'Back' option 742 and a 'Next' option 744) or by direct selection of the desired channel above.

Figure 8:
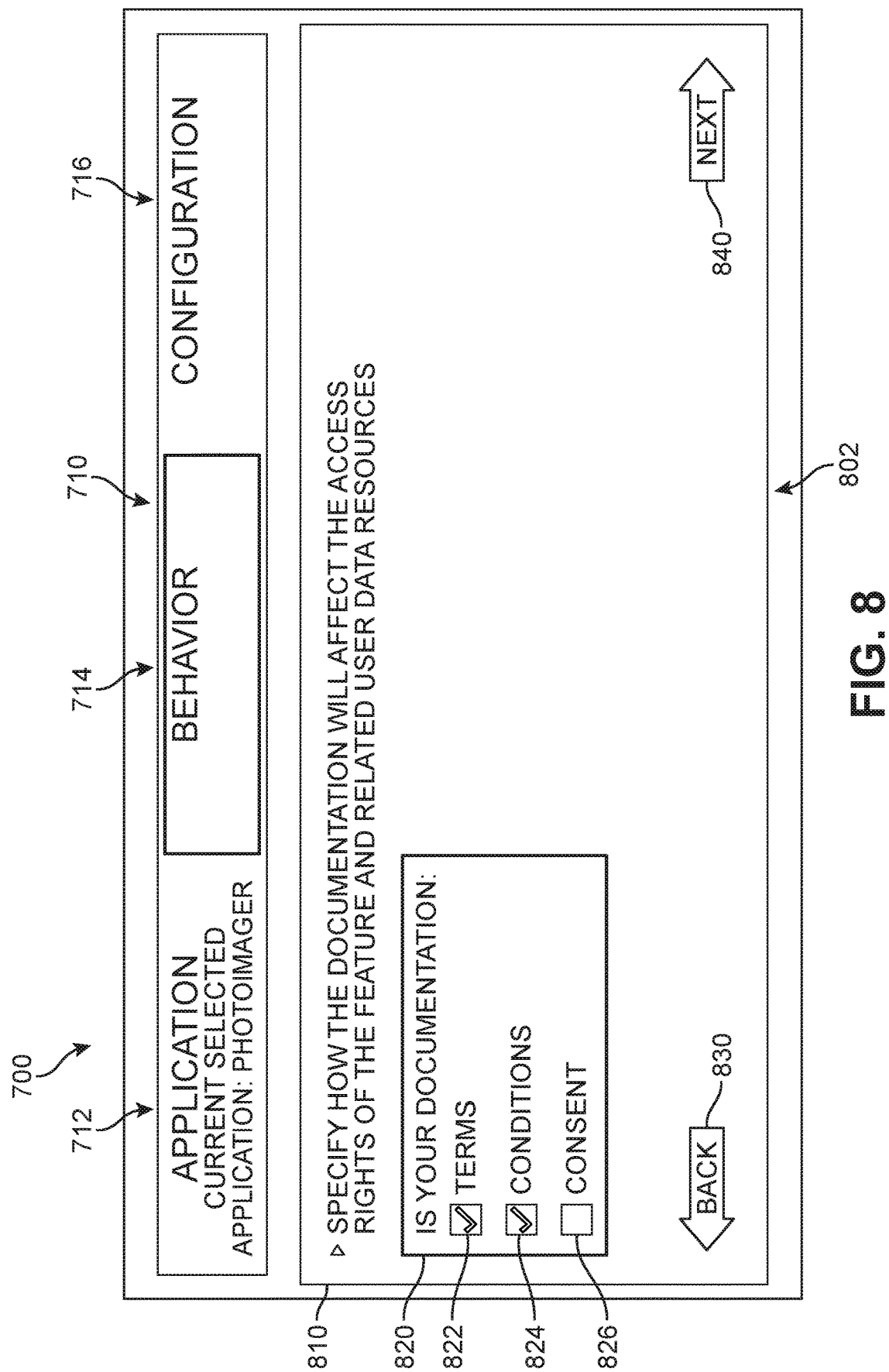
FIG. 8 illustrates an example of a user interface for management of application features and policies in which a designer may specify how the policy that will be linked to the feature(s) of FIG. 7 should be categorized, according to an embodiment.

In FIG. 8, the portal 700 now displays the next channel option associated with second option 714 ("Behavior") as a second policies manager interface ("second interface") 802. The second interface 802 allows the admin of an API to continue the consent upload or assignment process by selecting the type of policy that is to be linked to an application feature. In a second header section 810 ("Specify how the documentation will affect the access rights of the feature and related user data resources") the user may be shown instructions or information about categorizing or otherwise describing the type of policy that will be assigned to the feature. Some policy type categories are identified in a type section 820, including a first type 822 ("Terms"), a second type 824 ("Conditions"), and a third type 826 ("Consent"). By identifying the type of policy that is being added, the system can better configure the implementation of the content for that policy. The admin may select the types that apply to the content that will be used to establish the policy-feature relationship. In this case, the admin has selected first type 822 (Terms) and second type 826 (Conditions). These selections will be carried forward as the admin proceeds to the next step, either via navigation options (e.g., a 'Back' option 830 and a 'Next' option 840) or by direct selection of the desired channel above.

Figure 9:
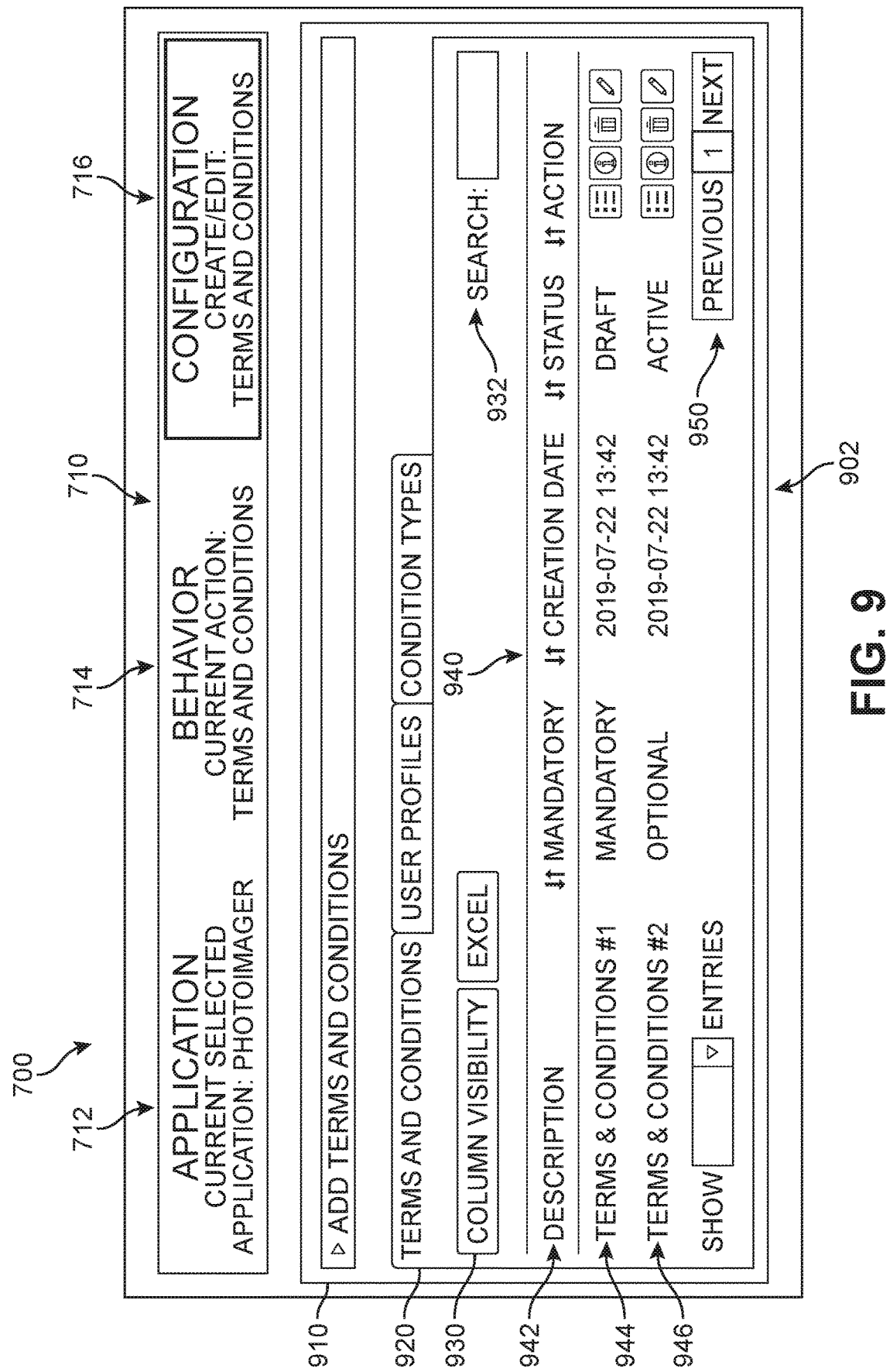
FIG. 9 illustrates an example of a user interface for management of application features and policies in which a designer may upload or input one or more electronic documents describing policy that will be linked to features of an application, according to an embodiment.

In FIG. 9, the portal 700 displays the channel option associated with third option 716 ("Configuration") as a third policies manager interface ("third interface") 902. The third interface 902 allows the admin continue the consent upload or assignment process by uploading or manually inputting (e.g., typing, pasting) the content of the policies that will be linked to the selected application feature(s). Selection of a third header section 910 ("Add terms and conditions") may expand the interface window to reveal options for identifying and uploading a text file, or offer an input box to paste or type the desired text directly into the interface. Once the text is received and saved, the admin can view the currently linked policies for the selected features, here including a first policy 944 and a second policy 946. In some embodiments, additional details 940 may also be viewable, such as whether the policy is mandatory or option, the policy creation date, and the policy status. Viewing options 930 can allow the admin to open, download, or otherwise access the information and/or full text of the policy in different formats. In some embodiments, a search box 932 is provided to allow the admin to locate text that include key words or phrases or is associated with particular attributes. In one implementation, the admin may also be able to modify or view other information, for example via tabs 920, in this case including user profiles and policy types.

Figure 10:
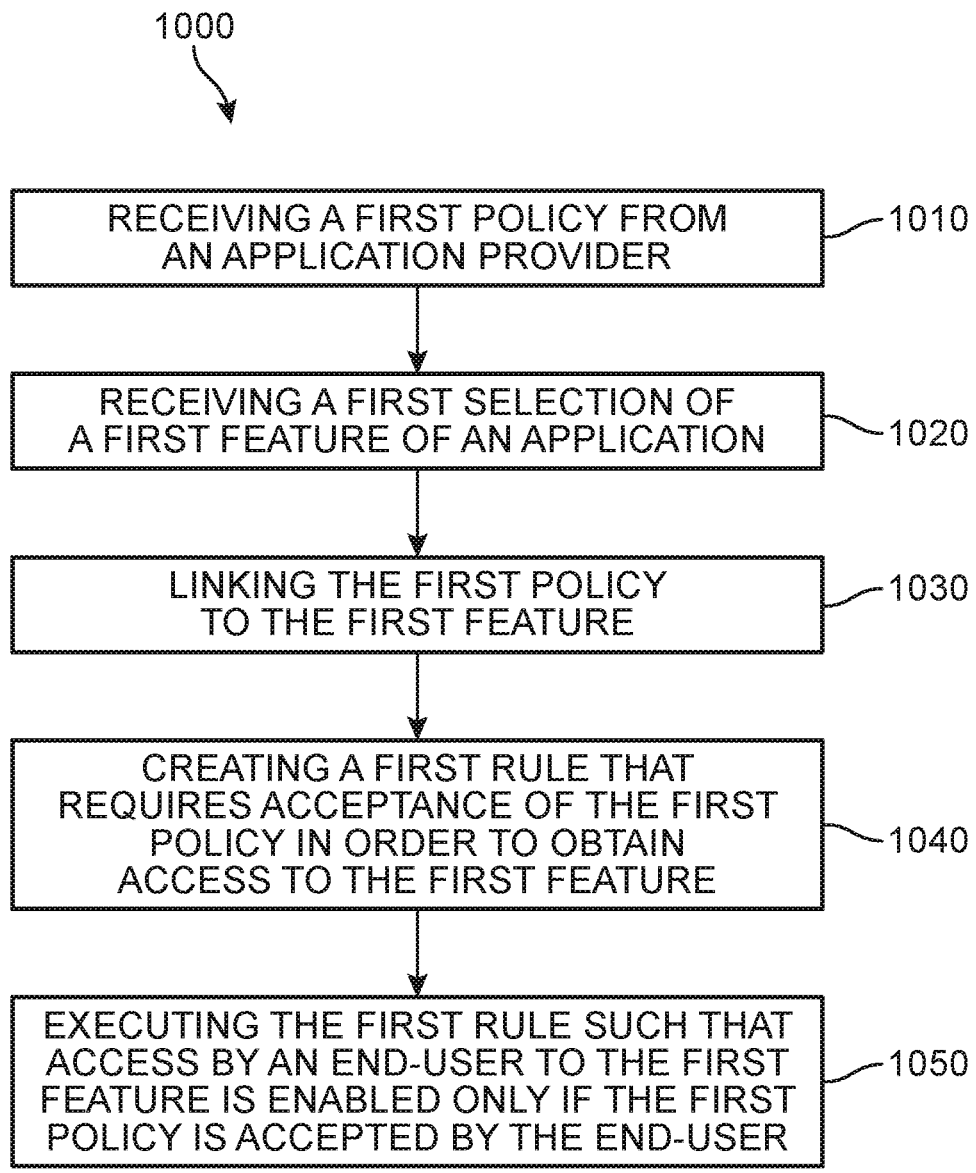
FIG. 10 is a method of managing application features and policies, according to an embodiment.

FIG. 10 is a flow chart illustrating an embodiment of a method 1000 of managing access by end-users to features of an application by use of a policy management service. A first step 1010 includes receiving, from an application provider, a first policy, and a second step 1020 includes receiving, from the application provider, a first selection of a first feature of an application. In addition, a third step 1030 includes linking, in response to the first selection, the first policy to the first feature, and a fourth step 1040 includes creating a first rule that requires acceptance of the first policy in order to obtain access to the first feature. A fifth step 1050 includes executing the first rule, via an API manager for the application, such that access by an end-user to the first feature is enabled only if the first policy is accepted by the end-user.

In other embodiments, the method may include additional steps or aspects. In one embodiment, the method also includes presenting, to the application provider, a user interface for inputting a plurality of text, receiving, via the user interface, a first textual content that corresponds to the first policy, and then storing an editable version of the first textual content until final approval of the first policy is received from the application provider. In another example, the method also includes receiving, from the application provider, a selection indicating that acceptance of the first policy is mandatory in order to access the service. In some embodiments, the method may include transmitting a signal to the API manager to create an XACML policy requiring acceptance of the first policy in order to enable access to the first feature.

In some cases, the first policy includes a condition that the end-user must agree to abide by in order to access the first feature, while in another example, the first policy includes a consent to permit access of a specific data resource associated with the end-user by a third party external to the application provider. In one embodiment, the first policy further includes an attribute that indicates whether the consent is recurring, and in another embodiment, the first policy further includes an attribute that indicates an expiration date for the consent. As another example, the first policy may further include an attribute that indicates an action that may be taken with respect to the specific data resource.

In other embodiments, the method can include additional steps of receiving, from the application provider, a second policy and a third policy, and receiving, from the application provider, a second selection of a second feature of the first application. The method may also include linking, in response to the second selection, the second policy and the third policy to the second feature, creating a second rule that requires acceptance of both the second policy and the third policy in order to obtain access to the second feature, and then executing the second rule, via the API manager, such that access by the end-user to the second feature is enabled only if the second policy and third policy are accepted by the end-user.

In different embodiments, the method may also include steps of receiving, from a first end-user, a request to access the first feature and the second feature, determining the first end-user has accepted the first policy and rejected the second policy, automatically presenting to the first end-user, in response to the determination, the second policy. If the second policy is rejected, the service can automatically enable access by the first end-user to the first feature and deny access to the second feature.

In another example, the method may further include steps of generating a user profile for a first end-user of the application, receiving, from the first end-user, a request to access the first feature, determining the first end-user has not accepted the first policy, automatically presenting to the first end-user, in response to the determination, the first policy, receiving an acceptance of the first policy by the first end-user, and enabling access of the first end-user to the first feature (in response to the presence or detection of the end-user's consent in the database of the API manager). In some embodiments, the method also includes storing a record of the acceptance with the user profile in an active directory. In one embodiment, the method also includes receiving, from the application provider, a modification to the first policy, and then automatically disabling access of the first end-user to the first feature until the modified first policy has been accepted by the first end-user.

Other methods can also be contemplated within the scope of this disclosure. For example, a method of providing regulating external access to data associated with an end-user may include steps of receiving a request, from an entity external to an application provider, to access a first data resource of a first end-user, identifying the first end-user with reference to a user profile for the first end-user in an active directory for an application, determining the user profile includes acceptance of a first policy, the first policy identifying the first data resource as being available to external entities and a frequency with which the first data resource may be accessed, and automatically providing access to the entity to the first data resource of the first end-user at the frequency indicated by the first policy. In one embodiment, the method also includes storing a record of all instances of access being granted to the entity to the first data resource.

As described herein, embodiments of the policy management service can be configured as an add-on service that may be readily integrated to a current client architecture and API manager product, with little to no changes required by the application provider. In one embodiment, the service is configured for implementation by any API manager on HTML, and can be embedded in such a way that the various levels of security compliance for that country or region are addressed. The service is integrated with existing front-end application (client or caller application) to enable comprehensive management over the lifecycle of user consents and terms and conditions. The service further provides options for user activity tracking to support external audit, and offers simplified mechanisms by which to manage the user's 'right to be forgotten' as well as data cleaning and data retention management. Furthermore, because in some embodiments the service is an out-of-the-box experience for application providers that is made available as a cloud-based service, the integration process is streamlined and ready for immediate use. The service can be used to grant third parties (external entities) appropriate and limited access to the user resources once the user has provided the relevant consent. In addition, the policies created by an application provider can be configured to link to different app features based on the user role or client application type, permitting a customization of the policy for different groups of users or app types. The system is highly effective as it offers mufti-tenancy management with the option to configure different policies for different tenants, enabling businesses or companies to reuse the same solution with different applications and clients while maintaining secure data segregation.

It should be understood that the systems and/or methods as described herein may be implemented using different computing systems, components, modules, and connections. An end-user or administrator may access various interfaces provided or supported by the policy management service, for example, via one or more devices capable of receiving, generating, storing, processing, and/or providing information, such as information described herein. For example, a user device may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device may receive information from and/or transmit information to the policy management service platform. For example, a device may include a bus, a processor, a memory, a storage component, an input component, an output component, and a communication interface.

The bus will include a component that permits communication among the components of the device. The processor is implemented in hardware, firmware, or a combination of hardware and software. The processor is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, a processor includes one or more processors capable of being programmed to perform a function. Memory includes a random access memory (RAM), a read only memory (ROM), and/or another type of dynamic or static storage device (e.g., a flash memory, a magnetic memory, and/or an optical memory) that stores information and/or instructions for use by a processor(s).

In addition, storage components store information and/or software related to the operation and use of the device. For example, storage components may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Furthermore, an input component includes a component that permits the device to receive information, such as via user input (e.g., a touch screen display, a keyboard, a keypad, a mouse, a button, a switch, and/or a microphone). Additionally, or alternatively, input components may include a sensor for sensing information (e.g., a global positioning system (GPS) component, an accelerometer, a gyroscope, and/or an actuator). The output component includes a component that provides output information from a device (e.g., a display, a speaker, and/or one or more light-emitting diodes (LEDs)).

A communication interface includes a transceiver-like component (e.g., a transceiver and/or a separate receiver and transmitter) that enables a device to communicate with other devices, such as via a wired connection, a wireless connection, or a combination of wired and wireless connections. The communication interface may permit the device to receive information from another device and/or provide information to another device. For example, a communication interface may include an Ethernet interface, an optical interface, a coaxial interface, an infrared interface, a radio frequency (RF) interface, a universal serial bus (USB) interface, a Wi-Fi interface, a cellular network interface, and/or the like.

Thus, the device may perform one or more processes described herein. The device may perform these processes based on processor executing software instructions stored by a non-transitory computer-readable medium, such as memory and/or storage component. A computer-readable medium is defined herein as a non-transitory memory device. A memory device includes memory space within a single physical storage device or memory space spread across multiple physical storage devices.

Software instructions may be read into memory and/or storage components from another computer-readable medium or from another device via communication interface. When executed, software instructions stored in memory and/or storage component may cause processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

In some implementations, a policy management service may be hosted in a cloud computing environment. Notably, while implementations described herein describe a policy management service as being hosted in cloud computing environment, in some implementations, a policy management service may not be cloud-based (i.e., may be implemented outside of a cloud computing environment) or may be partially cloud-based.

Cloud computing environment can include, for example, an environment that hosts the policy management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource").

Computing resources includes one or more personal computers, workstation computers, server devices, or other types of computation and/or communication devices. In some implementations, computing resources may host the policy management service. The cloud resources may include compute instances executing in computing resource, storage devices provided in computing resource, data transfer devices provided by computing resource, etc. In some implementations, computing resource may communicate with other computing resources via wired connections, wireless connections, or a combination of wired and wireless connections. In some embodiments, a computing resource includes a group of cloud resources, such as one or more applications ("APPs"), one or more virtual machines ("VMs"), virtualized storage ("VSs"), one or more hypervisors ("HYPs"), and/or the like.

Application includes one or more software applications that may be provided to or accessed by user devices. Application may eliminate a need to install and execute the software applications on a user device. For example, an application may include software associated with the policy management service and/or any other software capable of being provided via cloud computing environment 222, while in some embodiments, other applications are provided via virtual machines. A virtual machine can include a software implementation of a machine (e.g., a computer) that executes programs like a physical machine. A virtual machine may be either a system virtual machine or a process virtual machine, depending upon use and degree of correspondence to any real machine by virtual machine. A system virtual machine may provide a complete system platform that supports execution of a complete operating system ("OS"). A process virtual machine may execute a single program, and may support a single process. In some embodiments, virtual machines may execute on behalf of a user (e.g., a user of user device or an administrator of the policy management service), and may manage infrastructure of cloud computing environment, such as data management, synchronization, or long-duration data transfers.

Virtualized storage includes one or more storage systems and/or one or more devices that use virtualization techniques within the storage systems or devices of computing resources. In some embodiments, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisors may provide hardware virtualization techniques that allow multiple operating systems (e.g., "guest operating systems") to execute concurrently on a host computer, such as a computing resource. Hypervisors may present a virtual operating platform to the guest operating systems, and may manage the execution of the guest operating systems. Multiple instances of a variety of operating systems may share virtualized hardware resources.

A network includes one or more wired and/or wireless networks. For example, networks may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for managing access by end-users to individual features of a single application, the method comprising:
   receiving, from an application provider, a plurality of policies each related to the individual features of the application;
   receiving, from the application provider, a first selection of a first feature of the application for the first time;
   receiving, at an Application Programming Interface (API) manager for the application, pairing information from a policies manager that identifies which policies of the plurality of policies are assigned to the first feature;
   using the pairing information to create a first rule that requires acceptance of a first policy of the plurality of policies in order to obtain access to the first feature and that ensures that the first policy and the first feature are linked and that a request by a user for access to the first feature will trigger a corresponding presentation of the first policy;
   linking, in response to the first selection, the first policy to the first feature;
   responsive to the first selection, presenting to the first end-user the first policy without presenting policies of the plurality of policies that are not linked to the first feature;
   executing the first rule, via an API manager for the application, such that access by a first end-user to the first feature is enabled only if the first policy is accepted by the first end-user, wherein the first end-user is associated with a second end-user to whom the first end-user delegates permission to access the first feature on behalf of the first end-user via permission settings in a user profile of the first end-user; and
   enabling or blocking access by the second end-user to the first feature in response to access by the first end-user to the first feature being enabled or blocked, respectively.

2. The method of claim 1, further comprising:
   presenting, to the application provider, a user interface for inputting a plurality of text;
   receiving, via the user interface, a first textual content that corresponds to the first policy; and
   storing an editable version of the first textual content until final approval of the first policy is received from the application provider.

3. The method of claim 1,
   wherein the first end-user is associated with a device such that the device assumes that anyone using the device is doing so with authorization of the first end-user and access by a second end-user to the first feature using the device is enabled in response to access by the first end-user to the first feature being enabled; and wherein acceptance of the first policy is linked to the first end-user and linked to the device.

4. The method of claim 1, wherein the first policy includes a consent to permit access of a specific data resource associated with the first end-user by a third party external to the application provider.

5. The method of claim 4, wherein the first policy further includes an attribute that indicates whether the consent is recurring.

6. The method of claim 4, wherein the first policy further uses an HTTP authorization header to permit access of the specific data resource by the third party.

7. The method of claim 4, wherein the first policy further includes an attribute that indicates an action that may be taken with respect to the specific data resource.

8. The method of claim 1, further comprising enabling access by the second end-user to the first feature in response to access by the first end-user to the first feature being enabled.

9. The method of claim 8, further comprising transmitting a signal to the API manager to create an XACML policy requiring acceptance of the first policy in order to enable access to the first feature, wherein the XACML policy is configured to enable access only to a subset of services provided by the API manager, the services in the subset being assigned to a specific policy ID accepted by the first end-user.

10. The method of claim 1, further comprising:
receiving, from the application provider, a second selection of a second feature of the application;
linking, in response to the second selection, a second policy and a third policy of the plurality of policies to the second feature;
creating a second rule that requires acceptance of both the second policy and the third policy in order to obtain access to the second feature; and
executing the second rule, via the API manager, such that access by the first end-user to the second feature is enabled only if the second policy and third policy are accepted by the first end-user.

11. The method of claim 10, further comprising:
receiving, from the first end-user, a request to access the first feature and the second feature;
determining the first end-user has accepted the first policy and rejected the second policy;
automatically presenting to the first end-user, in response to the determination, the second policy;
receiving a rejection of the second policy; and
automatically enabling access by the first end-user to the first feature and denying access to the second feature.

12. A system for managing access by end-users to individual features of a single application, the system comprising:
a processor;
machine-readable media including instructions which, when executed by the processor, cause the processor to:
receive, from an application provider, a plurality of policies each related to the individual features of the application;
receive, from the application provider, a first selection of a first feature of the application for the first time;
receive, at an Application Programming Interface (API) manager for the application, pairing information from a policies manager that identifies which policies of the plurality of policies are assigned to the first feature;
use the pairing information to create a first rule that requires acceptance of a first policy of the plurality of policies in order to obtain access to the first feature and that ensures that the first policy and the first feature are linked and that a request by a user for access to the first feature will trigger a corresponding presentation of the first policy;
link, in response to the first selection, the first policy to the first feature;
responsive to the first selection, present to the first end-user the first policy without presenting policies of the plurality of policies that are not linked to the first feature;
execute the first rule, via an API manager for the application, such that access by the first end-user to the first feature is enabled only if the first policy is accepted by the first end-user, wherein the first end-user is associated with a second end-user to whom the first end-user delegates permission to access the first feature on behalf of the first end-user via permission settings in a user profile of the first end-user; and
enabling access by the second end-user to the first feature in response to access by the first end-user to the first feature being enabled.

13. The system of claim 12, wherein the instructions further cause the processor to:
present, to the application provider, a user interface for inputting a plurality of text;
receive, via the user interface, a first textual content that corresponds to the first policy; and
store an editable version of the first textual content until final approval of the first policy is received from the application provider.

14. The system of claim 12, wherein the first policy includes a consent to permit access of a specific data resource associated with the first end-user by a third party external to the application provider.

15. The system of claim 12,
wherein the first end-user is associated with a device such that the device assumes that anyone using the device is doing so with authorization of the first end-user and access by a second end-user to the first feature using the device is enabled in response to access by the first end-user to the first feature being enabled; and
wherein acceptance of the first policy is linked to the first end-user and linked to the device.

16. The system of claim 13, wherein the instructions further cause the processor to:
receive, from the application provider, a modification to the first policy; and
automatically disable access of the first end-user to the first feature until the modified first policy has been accepted by the first end-user.

17. A non-transitory computer-readable medium storing software comprising instructions executable by at least one processor which, upon such execution, cause the at least one processor to:
receive, from an application provider, a first policy;
receive, from the application provider, a first selection of a first feature of an application;
link, in response to the first selection, the first policy to the first feature;

create a first rule that requires acceptance of the first policy in order to obtain access to the first feature; and
execute the first rule, via an API manager for the application, such that access by a first end-user to the first feature is enabled only if the first policy is accepted by the first end-user, wherein:
 the first end-user is associated with a device such that the device assumes that anyone using the device is doing so with authorization of the first end-user and access by a second end-user to the first feature using the device is enabled in response to access by the first end-user to the first feature being enabled; and
 acceptance of the first policy is linked to the first end-user and linked to the device;
receive, from the application provider, a second policy and a third policy;
receive, from the application provider, a second selection of a second feature of the application;
link, in response to the second selection, the second policy and the third policy to the second feature;
create a second rule that requires acceptance of both the second policy and the third policy in order to obtain access to the second feature;
execute the second rule, via the API manager, such that access by the first end-user to the second feature is enabled only if the second policy and third policy are accepted by the first end-user.

18. The non-transitory computer-readable medium storing software of claim 17, wherein the first policy includes a consent to permit access of a specific data resource associated with the first end-user by a third party external to the application provider.

19. The non-transitory computer-readable medium storing software of claim 17, wherein the instructions further cause the at least one processor to:
receive, from the first end-user, a request to access the first feature and the second feature;
determine the first end-user has accepted the first policy and rejected the second policy;
automatically present to the first end-user, in response to the determination, the second policy;
receive a rejection of the second policy; and
automatically enable access by the first end-user to the first feature and denying access to the second feature.

20. The non-transitory computer-readable medium storing software of claim 17, wherein the first end-user is associated with a second end-user to whom the first end-user delegates permission to access the first feature on behalf of the first end-user via permission settings in a user profile of the first end-user and access by the second end-user to the first feature is enabled in response to access by the first end-user to the first feature being enabled.

* * * * *